US005585827A

United States Patent [19]

Murakami

[11] Patent Number: 5,585,827

[45] Date of Patent: Dec. 17, 1996

[54] PRINTER HEAD

[75] Inventor: Takaaki Murakami, Kanagawa, Japan

[73] Assignee: Sony Corporation, Japan

[21] Appl. No.: 326,515

[22] Filed: Oct. 20, 1994

[30] Foreign Application Priority Data

Oct. 29, 1993 [JP] Japan .................................... 5-271436

[51] Int. Cl.[6] ..................................................... G01D 15/18

[52] U.S. Cl. ................................................. 347/64; 347/65

[58] Field of Search ................................. 347/63, 64, 65, 347/20; 228/123.1, 198

[56] References Cited

U.S. PATENT DOCUMENTS

| | | | |
|---|---|---|---|
| 3,662,399 | 5/1972 | Yanou et al. | 347/45 |
| 4,276,533 | 6/1981 | Tominaga et al. | 338/4 |
| 4,312,008 | 1/1982 | Taub et al. | 347/71 |
| 5,046,656 | 9/1991 | Schmitt et al. | 228/123 |
| 5,096,535 | 3/1992 | Hawkins et al. | 156/633 |

FOREIGN PATENT DOCUMENTS

| | | |
|---|---|---|
| 56-93566 | 7/1981 | Japan . |
| 63-47631 | 9/1988 | Japan . |

*Primary Examiner*—Valerie A. Lund

*Attorney, Agent, or Firm*—Ronald P. Kananen

[57] ABSTRACT

In the printer head of this invention, the base component 1 and the lid component 5 can be easily bonded without clogging the groove 2 that serves as the ink flow channel. The eutectic alloy layer 3 is formed by a eutectic reaction on the bonding surface between the base component 1 having the groove 2 composed of silicon formed thereon and the lid component 5 having the thin gold film 4 formed thereon. Therefore, the base component/and the lid component 5 are bonded to each other.

6 Claims, 7 Drawing Sheets

PRINTER HEAD

BACKGROUND OF THE INVENTION

1. Field of the Invention

The present invention relates to a printer head which is preferably applicable, for example, to an ink jet printer, and a method for manufacturing thereof.

2. Description of the Related Art

FIG. 1 is a front view showing a construction of one example of a conventional ink jet printer head disclosed in Japanese Patent Publication No. 47631/1988 (Japanese Patent Laid-Open No. 93566/1981). A base component 1 is composed of, for example, glass, metal, silicon (hereinafter referred to as "Si"), and the like. On the upper surface of the base component 1, fine grooves (recessed portions) 22 are formed by a technique such as cut processing using a microcutter, and etching processing. On the surface on which the grooves 22 of the base component 1 are formed, a lid component 5 made of glass is bonded by a fluid adhesive 21 such as epoxy resin 21 adhesive coated on the projecting portion. Thus, the grooves 22 form an ink flow channel.

In the head as constituted above, the ink is discharged through the grooves (ink flow channel) 22 to adhere to the printing paper, so that printing is performed.

The ink discharge method is divided roughly into two types; an electric machine conversion method and a heating evaporation method.

When the electric machine conversion method is applied for the ink discharge method, a piezoelectric element (electric distortion element) is bonded and fixed on the upper surface of the lid component 5. Then, in such a case, the lid component 5 serves as an oscillation plate, which is distorted by the piezoelectric element to the side of the grooves (ink flow channel) 22 to reduce the volume. Thereby pressure is generated in the grooves (ink flow channel) 22 so that the ink is discharged with the pressure. Incidentally, some heads available for electric machine conversion method have a construction in which the piezoelectric element and the ink directly contact each other instead of a head which has a construction in which the piezoelectric element generates pressure in the groove 22 via the lid component 5.

In addition, when heating evaporation method is adopted as the ink discharge method, a heating element is formed at a predetermined position in the grooves 22 formed on the base component 1 before the lid component 5 is bonded to the base component 1. Then, in such a case, a bubble is generated in the ink inside of the groove (ink flow channel) by heating the heating element to discharge the ink with the pressure of the bubble.

In the aforementioned ink jet printer head, the size of the grooves 22 formed on the base component 1 must be miniaturized to enable to obtain a higher resolution and higher quality in the printing result.

In addition, recently, a multiple nozzle head, namely the head provided with a plurality of grooves 22 for discharging ink, as shown in FIG. 1, has been used as the representative style of head. It is needed that not only the size of the grooves are made smaller but also the pitch, or distance between the grooves 22, is made smaller to attain higher resolution and higher quality.

However, when the size of the grooves 22 and the size of the pitch are made smaller, there arises a problem in which it becomes difficult to bond the base component 1 and the lid component 5 by a fluid adhesive 21.

Namely, in such a case, bonding conditions for bonding the base component 1 and the lid component 5, such as the coating amount of the adhesive 21 and the bond pressure, becomes very delicate, so that a high-level technique is needed. Moreover, when the bonding conditions do not meet the actual situation, a non-cured adhesive agent 21 flows into the grooves 22 where the adhesive agent is cured to clog the grooves 22.

SUMMARY OF THE INVENTION

In view of the foregoing, an object of this invention is to provide a printer head and a method for manufacturing thereof in which the lid component is easily bonded to the base component on which fine grooves are formed, without clogging the grooves.

The foregoing object and other objects of the invention have been achieved by the provision of the printer head used for an ink jet printer, comprising the base component 1 having a groove 2 formed and the lid component 5 fixed by bonding on the surface of the base component 1 on which the grooves are formed, in which an eutectic alloy layer 3 generated by the eutectic reaction is formed on the bonding surface of the base component 1 and the lid component 5.

In this printer head, it can be realized that the eutectic alloy layer 3 is generated by the eutectic reaction between gold and silicon.

The method for manufacturing the printer head of the present invention is a method for manufacturing the printer head used for the ink jet printer, comprising process for forming the groove 2 on the base component 1 and process for forming the eutectic alloy layer 3 by the eutectic reaction between the lid component 5 and the surface of the base component 1 on which the groove 2 is formed, and for bonding the base component 1 and the lid component 5.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
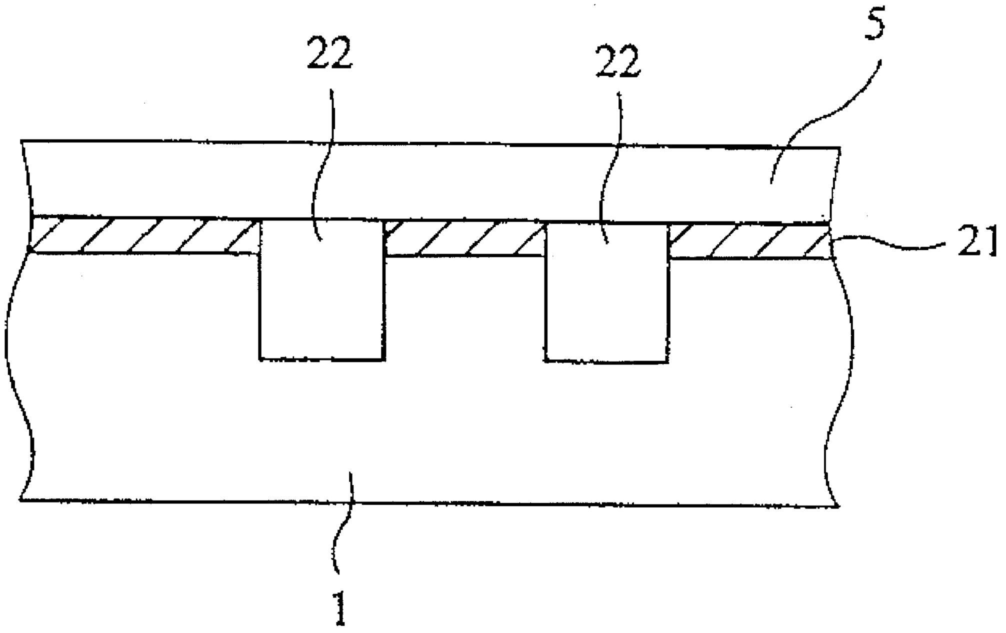
FIG. 1 (RELATED ART)
FIG. 1 is a front view showing the construction of an example of the conventional ink jet printer head.
Figure 2:
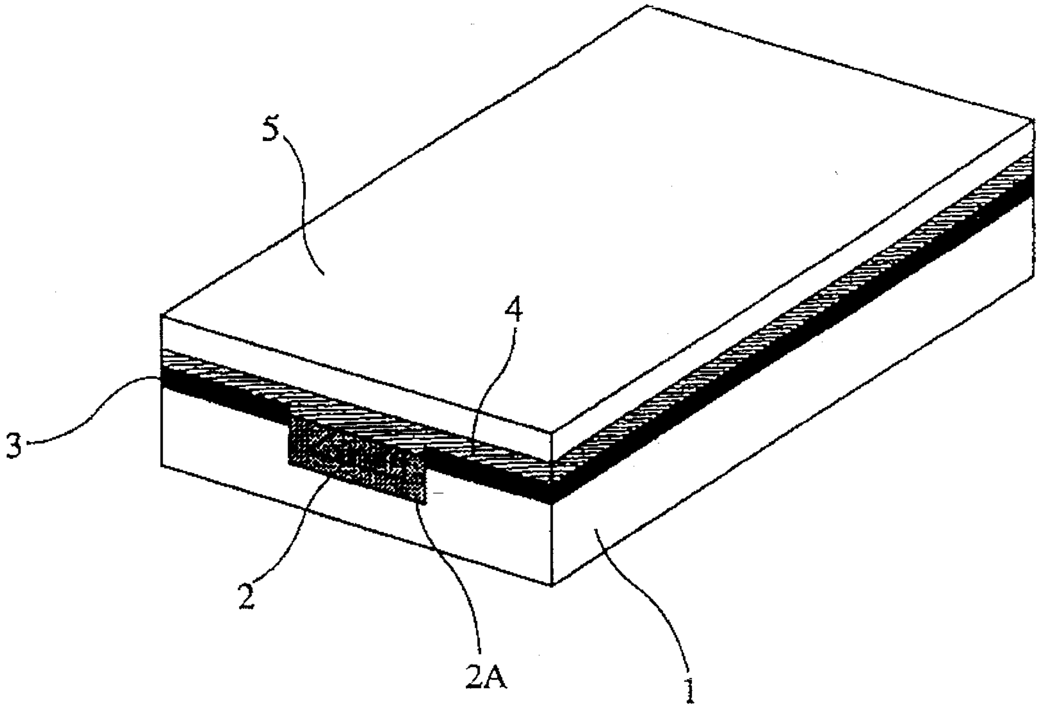
FIG. 2 is a perspective view showing the construction of one embodiment of the ink jet printer head according to the present invention.
Figure 3:
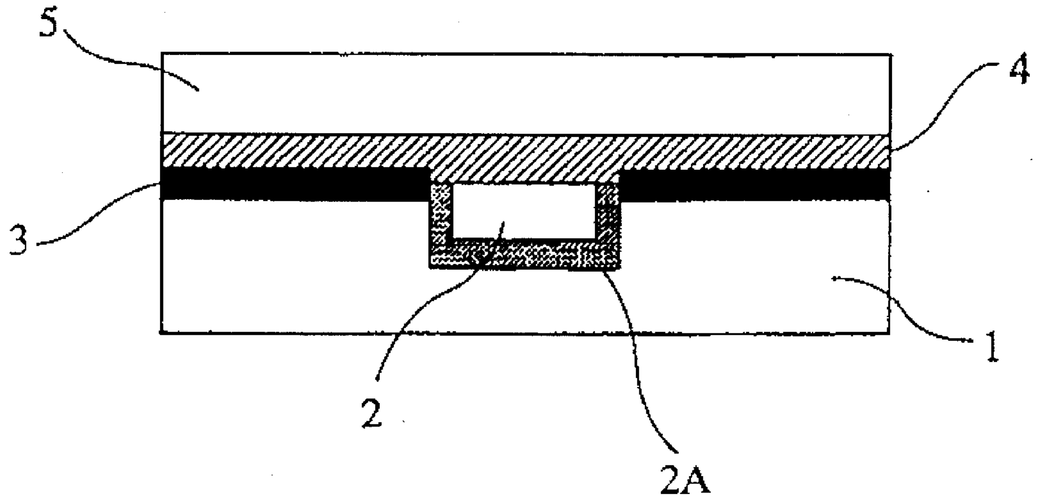
FIG. 3 is a front view of the embodiment shown in FIG. 2.

Preferred embodiments of this invention will be described with reference to the accompanying drawings:

FIG. 2 is a perspective view showing the construction of the ink jet printer head, which is applied as the printer head of the present invention, according to one embodiment of the present invention, and FIG. 3 is a front view thereof. Incidentally, the same numerals designate parts in FIGS. 2 and 3 corresponding to parts in FIG. 1.

A base component 1 is composed of, for example, a single crystal of Si (110). On the upper surface thereof, for example, a recessed groove 2 is formed which have a size on the order of, for example, about 20 or 30 [μm]×20 or 30 [μm]. On the surface of the groove 2, a silicon oxide layer 2A composed of $SiO_2$ is formed. On the upper surface of the base component 1, a lid component 5 is provided in which a thin gold film layer 4 is formed on the plane being opposite to the base component 1 via an eutectic alloy layer 3 as follows, therefore the groove 2 formed on the base component 1 forms an ink flow channel.

Then, on the surface on which the portion of the upper surface of the base component 1 where Si is exposed (excluding the groove 2 and the silicon oxide layer 2A formed on the groove 2) and the thin gold film layer 4 formed on the lid component 5 are contacted, the eutectic alloy layer 3 (the eutectic alloy of gold and Si) is formed which is generated by the eutectic reaction between gold and Si.

In the ink jet printer head constituted described above, for example, the ink (not shown) is discharged via the groove (ink flow channel) 2 by the electric machine conversion method or the heating evaporation method to be stuck onto printing paper, so that the printing is performed.

In this ink jet printer head, since the portion contacting the ink is the thin gold film 4 formed on the lid component 5 and the silicon oxide layer 2A, the printer is excellent in drug resistance. For example, alkaline ink can be used.

Figure 4A:
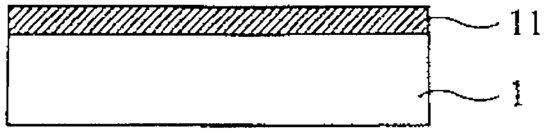
FIGS. 4A to 4G are views explaining a method for manufacturing the ink jet printer head of the embodiment shown in FIG. 2.

Next, following explanation is the method for manufacturing the ink jet printer head will be explained referring to FIGS. 4A to 4G. At the outset, as shown in FIG. 4A, a silicon nitride film ($Si_3N_4$ film) 11 is formed by CVD (chemical vapor deposition) and the like on the upper surface of the base component 1 composed of single crystal of Si (110). The silicon nitride film 11, it is to be noted as follows, is used as an etching mask.

Figure 4B:
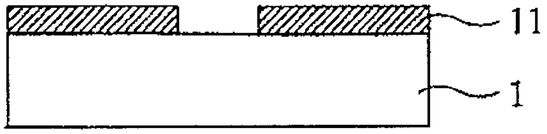
Figure 4C:
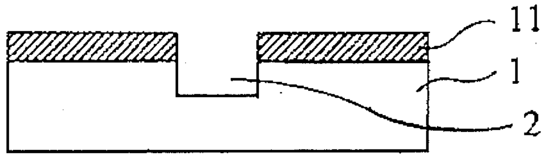

Then, of the silicon nitride film 11 formed on the upper surface of the base component 1, a portion corresponding to the groove 2 (shown in FIGS. 2 and 3) is removed by, for example, photoetching by heated phosphoric acid. Consequently, the base component (Si) 1 is exposed (FIG. 4B). Furthermore, wet etching by, for example, a solution of potassium hydroxide is applied to the exposed portion of the base component 1, thereby the groove 2 is formed (FIG. 4C). At that time, the silicon nitride film 11 explained in FIG. 4A functions as an etching mask.

Figure 4D:
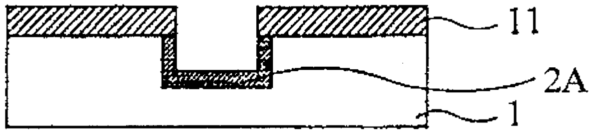

Next, the groove 2 formed in the above manner is undergone the thermal oxidation and a silicon oxidation layer 2A is formed on the surface thereof (FIG. 4D). Consequently, the ink does not come into contact with the silicon itself which constitutes the base component 1 and flows in the groove 2. Therefore, the reduction in fluidity caused by water repellency of silicon, the corrosion of silicon by the ink, and the like can be prevented. Consequently, the silicon oxide layer 2A serves as a protective film.

Figure 4E:
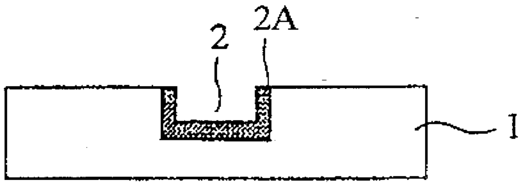

Thereafter, as shown in FIG. 4E, only the silicon nitride film 11 formed on the upper surface of the base component 1 is removed by using, for example, heated phosphoric acid, leaving the silicon oxide layer 2A remaining.

Figure 4F:
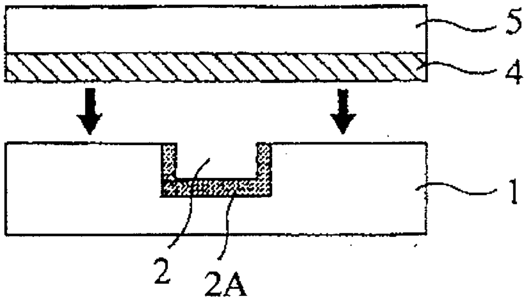

Then, as shown in FIG. 4F, one surface of the lid component 5 on which a thin gold film 4 is formed is brought into contact with the base component 1 so that the thin gold film 4 is confronted to the surface on which the groove 2 is formed. It is to be noted that the lid component 5 is composed of, for example, a heat resistant glass, such as Pyrex® glass and the like, and one surface thereof is ground and the thin gold film 4 is formed by vapor deposition and so After the lid component 5 is brought into contact with the base component 1, namely after the thin gold film 4 formed on the lid component 5 is brought into contact with Si exposed on the upper surface of the base component 1, pressure is applied thereto. Then, it is heated at about 400 [° C.], for example, in the inactivated gas atmosphere such as nitrogen gas and argon gas during scrubbing (rubbing).

Figure 4G:
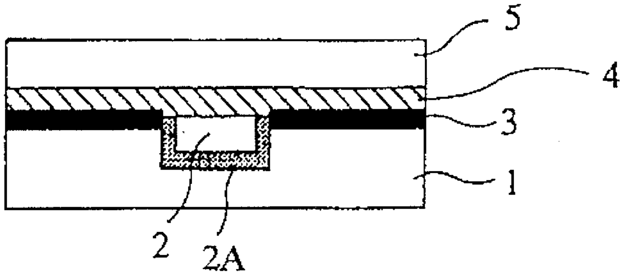

Then, between the thin gold film 4 and the upper surface of the base component 1 contacting each other, namely between gold and Si, the eutectic crystal reaction proceeds to form a eutectic alloy layer 3 and to form a fused state. When the eutectic alloy layer 3 is cooled down, it hardens, namely, the portion at which the thin gold film 4 formed on the lid component 5 contacts the base component 1 except for the groove 2 is made into selectively eutectic alloy. This allows the base component 1 and the lid component 5 to be strongly bonded without clogging the groove 2 (FIG. 4G).

Figure 5:
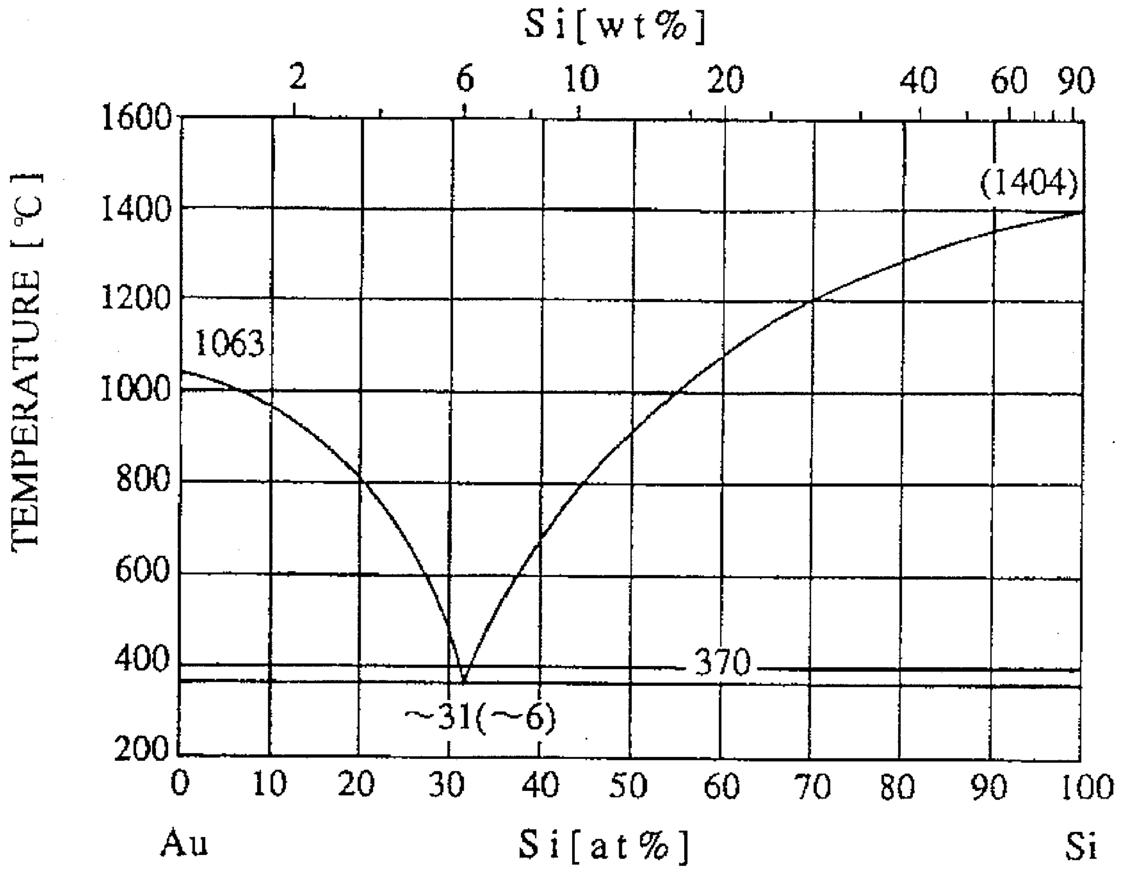
FIG. 5 is a view showing an equilibrium state of the Au-Si system.

Here, FIG. 5 shows the equilibrium state of the gold(Au)-Si system. As is apparent from FIG. 5, since Au and Si have a melting point of 1,063 [° C.] and 1,404 [° C.], respectively, these metals are not molten at 400 [° C.]. However, since Au-31 at. % Si has a melting point of 370 [° C.] at the eutectic point, the eutectic reaction occurs during heating at 400 [° C.] at the interface of Au/Si. This forms an eutectic alloy of Au and Si at the contact portion of the thin gold film 4 and the base component 1 to generate a fused state.

As described above, an example is shown herein below in a case where the base component 1 and the lid component 5 are bonded with the eutectic alloy layer 3.

| | |
|---|---|
| Heating temperature | about 400 [°C.] |
| Applied Pressure | about 50 to 150 [g] |
| Scrub time | about 1 to 3 [sec] |
| Scrub cycle | about 5 to 30 times |
| Scrub Oscillation | about several to more than tens [μm] |
| Inactivated gas atmosphere | about 2 to 10 [l/min] |

Figure 6A:
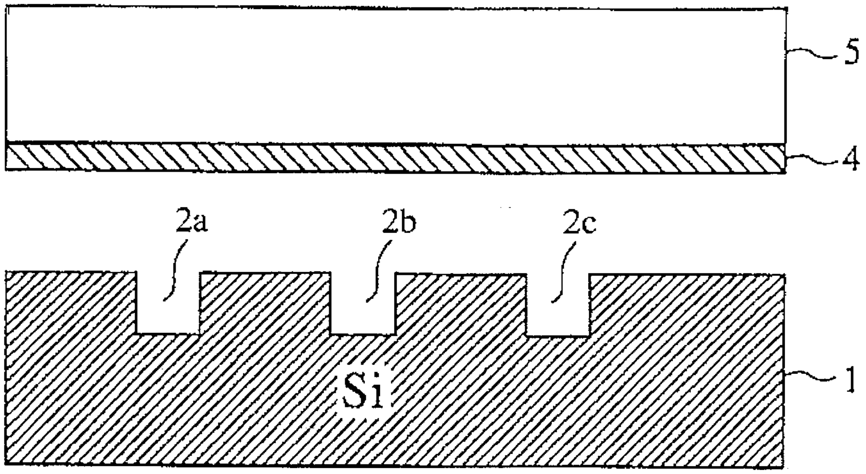
FIGS. 6A and 6B are views showing a state in which the base component 1 and the lid component 5 are bonded in the case of manufacturing a multiple-nozzle head.
Figure 6B:
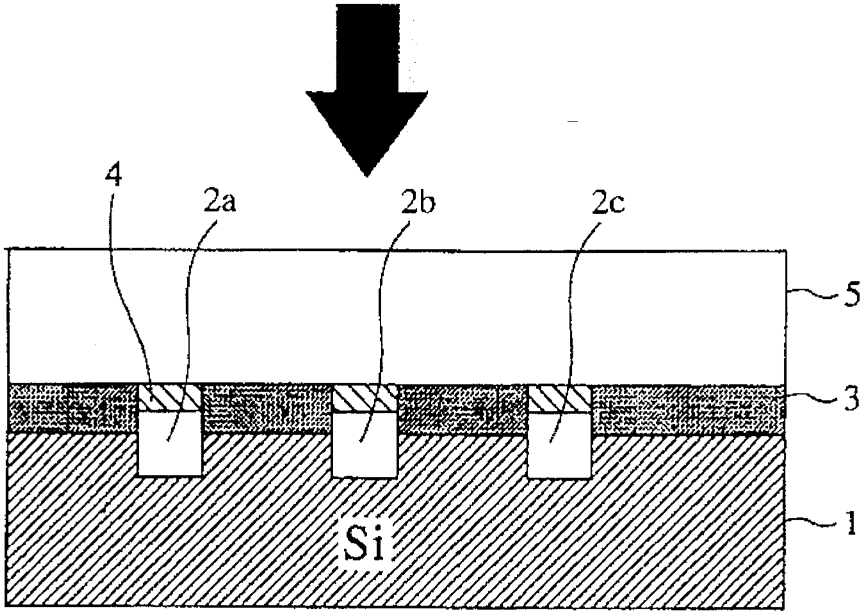

In this manner, a case has been explained in which the present invention has been applied to a single-nozzle ink jet printer head. However, the present invention is not only limited to this, but can be applied to a case of a multiple-nozzle head having a plurality of nozzles. FIGS. 6A and 6B show a state where the base component 1 is bonded to the lid component 5 when a multiple-nozzle head having, for example, three grooves (nozzles) 2-1 or 2-3 is manufactured. Incidentally, referring to FIGS. 6A and 6B, all the portions of the thin gold film 4 which contacts with the portion of the base component 1 except for the grooves 2*a*, 2*b*, and 2*c* are regarded as the eutectic alloy layer 3.

Furthermore, a method for bonding by the eutectic reaction described in this embodiment can be applied not only when the base component 1 and the lid component 5 are bonded, but also to other situations. Namely, in the head shown in FIGS. 1, 2, and 3, an orifice plate is usually provided on a surface to which ink is discharged: This method can be applied in a case where the orifice plate and the head are bonded. In this case, if the orifice plate is formed of, for example, nickel and the like, it can be proper to have the orifice plate contact the head after an Au thin film is formed.

Furthermore, in this embodiment, silicon single crystal or heat resistant glass, such as Pyrex glass, is used as the base component 1 or the lid component 5. However, this invention is not limited to this.

In other words, as the base component 1, the materials such as stainless steel and so on can be used on which a thin silicon film layer can be formed by some methods (for example, CVD standing for plasma chemical vapor deposition and the like) using some material, and have heat resistance against the melting point at the eutectic point of silicon and gold. In addition, as the lid component 5, the materials for example, silicon or metal can be used on which can form a thin gold film by some methods, and has heat resistance against the melting point at the eutectic point of silicon or gold.

Furthermore, in this embodiment, the thin gold film 4 is formed on the lid component 5 by vapor deposition. However, the present invention is not only limited to this, but, for example, the thin gold film 4 can be formed on the lid component 5 by plating or some other methods. In the case of plating, after the lid component 5 formed of the heat-resistant glass is plated with nickel, it may be further plated with gold by electrolysis.

In this embodiment, the eutectic alloy layer 3 is formed of Au and Si. However, the present invention is not only limited to this, but the eutectic alloy layer may be formed of such a metal as Sn (tin) and Pb (lead), Au and Ge (germanium), Au and Sn, or Al (aluminum) and Si, each having a melting point of 183 [° C.], 356 [° C.], 280 [° C.], or 577 [° C.] respectively at the eutectic point.

Provided that, in this case, each thin film can be formed on the base component 1 and the lid component 5 by vapor deposition or plating, and the base component 1 and the lid component 5 have heat resistance against the melting point at the eutectic point.

Furthermore, many substances can be used for the two materials forming the eutectic alloy layer 3. However, if the difference between the melting point of each of the single material and the melting point at the eutectic point is small, temperature control must be accurately performed during the heating operation. Thus, a larger difference between them is preferable.

Figure 7:
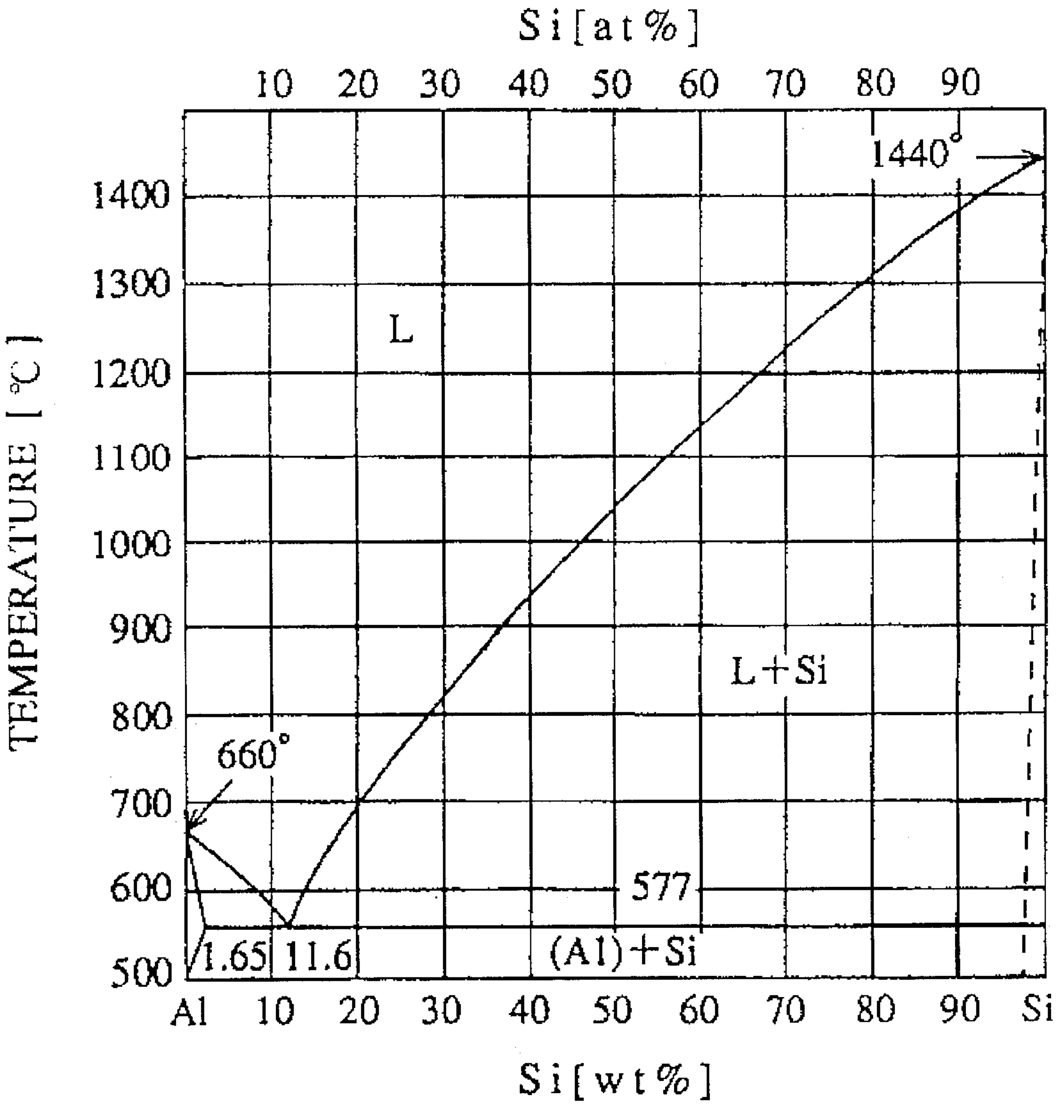
FIG. 7 is a view showing the state of equilibrium of the Al-Si system.

More specifically, the equilibrium state of the aforementioned Al-Si system becomes like that shown in FIG. 7, which shows that the melting point of a single substance, Al or Si, is 660 [° C.] or 1,404 [° C.] respectively, and the melting point at the eutectic point is 577 [° C.]. In this case, the difference between the melting point of a single substance Al and the melting point at the eutectic point is small, probably only about 8.3 [° C.]. Thus, it is necessary to control the temperature at heating so that the temperature exceeds 577 [° C.] without exceeding 660 [° C.,], which means the scope of allowable error for temperature control is narrow. Consequently, when the accuracy of temperature control is low, the eutectic reaction does not take place, and a single substance such as Al may be melted in some cases, although this is undesirable.

It is to be noted that, in the case of the combination of Au and Si described in the embodiment, even the smaller difference, between the melting point of Au single substance and the melting point at the eutectic point of Au and Si, is about 693 [° C.], which is sufficiently large. Consequently, the temperature control can be simple compared with the combination of Al and Si.

Furthermore, in this embodiment, when the base component 1 and the lid component 5 are bonded, two components are heated while scrubbing, but scrubbing may not be performed. However, heating accompanied by scrubbing further promotes the eutectic reaction.

Still furthermore, the present invention can be applied to any type of ink jet printer head such as a bubble jet type of edge-shooter or side shooter and the like. Furthermore, the present invention can be applied to another type of printer head constructed by bonding the lid component to the base component, in addition to the ink jet printer head.

It is to be noted that the melting points of the Si single substance in FIGS. 5 and 7 are not equal. This is because conditions such as air pressure and the like are different when the melting point is examined.

As described above, in accordance with the printer head of the present invention and the method for manufacturing thereof, the base component having a groove formed thereon is bonded to the lid component by forming the eutectic alloy layer by the eutectic reaction. Consequently, the base component and the lid component can be easily bonded without clogging the groove.

Furthermore, in accordance with the present invention, the eutectic alloy layer can be generated by eutectic reaction between gold and silicon, so that the resistance against corrosion can be improved.

While there has been described in connection with the preferred embodiments of the invention, it will be obvious to those skilled in the art that various changes and modifications may be made without departing from the true spirit and scope of the invention. It is aimed, therefore, to cover in the appended claims all such changes and modifications as fall within the true spirit and scope of the invention.

What is claimed is:

1. A printer head for use in an ink jet printer, comprising:

a base component composed of silicon and having a groove formed in a surface of said base component, said groove having a silicon oxide protective layer defining an ink flow channel;

a lid component having a gold film layer on a surface thereof, said lid component being placed in contact with said base component such that said gold film layer defines a wall of said ink flow channel; and a eutectic bond being formed between said gold film layer and said surface of said base component by a eutectic reaction between said gold film layer and the silicon of said base component.

2. The printer head according to claim 1, wherein said silicon base component is composed of silicon single crystal or heat-resistant glass.

3. The printer head according to claim 1, wherein said lid component is composed of silicon single crystal or heat-resistant glass.

4. The printer head according to claim 1, wherein said thin gold film is formed on a bonding surface of said lid component.

5. The printer head according to claim 1, wherein said silicon oxide protective layer is generated on a surface of said groove.

6. A printer head which is used in an ink jet printer, comprising:

a base component having a groove formed thereon, wherein a silicon oxide layer is generated on a surface of said groove; and a lid component bonded to a surface of said base component on which said groove is formed;

wherein a eutectic alloy layer generated by a eutectic reaction between gold and silicon is formed on a bonding surface between said base component and said lid component, and wherein a thin gold film is formed on a bonding surface of said lid component, said thin gold film and said silicon oxide layer of said groove together defining an ink flow channel of said printer head.

* * * * *